United States Patent
Yarvis

(10) Patent No.: US 7,907,732 B2
(45) Date of Patent: Mar. 15, 2011

(54) RADIO FREQUENCY IDENTIFICATION TAG LOCK AND KEY

(75) Inventor: Mark D. Yarvis, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 1960 days.

(21) Appl. No.: 10/812,651

(22) Filed: Mar. 29, 2004

(65) Prior Publication Data

US 2006/0059367 A1 Mar. 16, 2006

(51) Int. Cl.
*H04K 1/00* (2006.01)
*G08B 13/14* (2006.01)

(52) U.S. Cl. ............... 380/270; 340/568.1; 340/572.1

(58) Field of Classification Search ............... None
See application file for complete search history.

(56) References Cited

U.S. PATENT DOCUMENTS

| | | | |
|---|---|---|---|
| 6,577,238 B1 * | 6/2003 | Whitesmith et al. | 340/572.1 |
| 6,789,194 B1 * | 9/2004 | Lapstun et al. | 713/176 |
| 6,957,767 B2 * | 10/2005 | Aupperle et al. | 232/45 |
| 6,967,577 B2 * | 11/2005 | Taylor et al. | 340/572.1 |
| 6,992,574 B2 * | 1/2006 | Aupperle et al. | 340/505 |
| 7,271,715 B2 * | 9/2007 | Aupperle et al. | 340/539.13 |
| 2002/0008140 A1 * | 1/2002 | Reynolds et al. | 235/385 |
| 2006/0033608 A1 * | 2/2006 | Juels et al. | 340/10.1 |

* cited by examiner

*Primary Examiner* — Kaveh Abrishamkar
(74) *Attorney, Agent, or Firm* — Trop, Pruner & Hu, P.C.

(57) ABSTRACT

Briefly, in accordance with one embodiment of the invention, a radio frequency identification tag system includes a lock tag to secure an item or an area, and one or more key tags associated with the lock tag to allow access to the item or area or to otherwise validate the lock tag and key tag. A detector allows access or other validation when a valid key tag is determined to be present within a predetermined range of the lock tag.

17 Claims, 3 Drawing Sheets

RADIO FREQUENCY IDENTIFICATION TAG LOCK AND KEY

BACKGROUND OF THE INVENTION

The present invention relates generally to the field of radio frequency identification (RFID) tags. RFID tags are typically utilized to detect the presence or identity of a physical object wherein an RFID tag attached to the object may be detected, although the scope of the invention is not limited in this respect.

DESCRIPTION OF THE DRAWING FIGURES

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
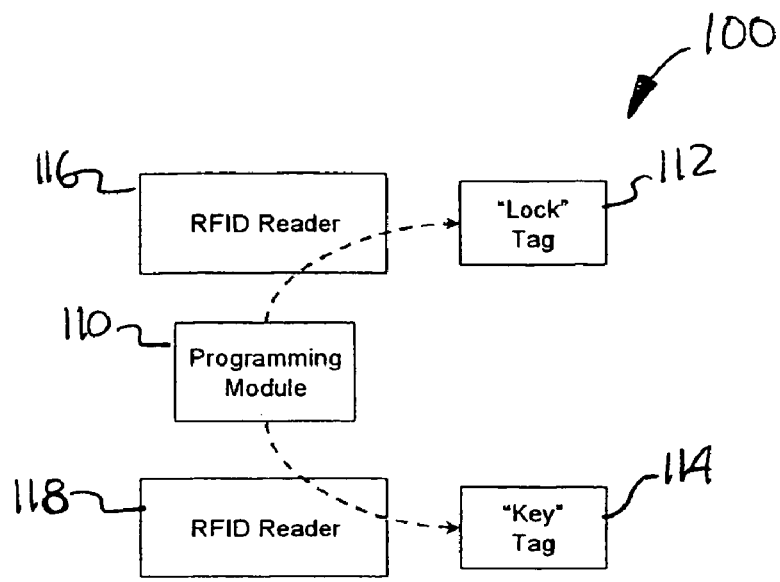
FIG. 1 is a block diagram of a lock and key programming architecture to program a pair of radio frequency identification tags in accordance with one embodiment of the present invention.

It will be appreciated that for simplicity and clarity of illustration, elements illustrated in the figures have not necessarily been drawn to scale. For example, the dimensions of some of the elements are exaggerated relative to other elements for clarity. Further, where considered appropriate, reference numerals have been repeated among the figures to indicate corresponding or analogous elements.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

Some portions of the detailed description that follows are presented in terms of algorithms and symbolic representations of operations on data bits or binary digital signals within a computer memory. These algorithmic descriptions and representations may be the techniques used by those skilled in the data processing arts to convey the substance of their work to others skilled in the art.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, as apparent from the following discussions, it is appreciated that throughout the specification discussions utilizing terms such as processing, computing, calculating, determining, or the like, refer to the action or processes of a computer or computing system, or similar electronic computing device, that manipulate or transform data represented as physical, such as electronic, quantities within the registers or memories of the computing system into other data similarly represented as physical quantities within the memories, registers or other such information storage, transmission or display devices of the computing system.

Embodiments of the present invention may include apparatuses for performing the operations herein. This apparatus may be specially constructed for the desired purposes, or it may comprise a general purpose computing device selectively activated or reconfigured by a program stored in the device. Such a program may be stored on a storage medium, such as, but is not limited to, any type of disk including floppy disks, optical disks, CD-ROMs, magnetic-optical disks, read-only memories (ROMs), random access memories (RAMs), electrically programmable read-only memories (EPROMs), electrically erasable and programmable read only memories (EEPROMs), flash memory, magnetic or optical cards, or any other type of media suitable for storing electronic instructions, and capable of being coupled to a system bus for a computing device.

The processes and displays presented herein are not inherently related to any particular computing device or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the invention as described herein.

In the following description and claims, the terms coupled and connected, along with their derivatives, may be used. In particular embodiments, connected may be used to indicate that two or more elements are in direct physical or electrical contact with each other. Coupled may mean that two or more elements are in direct physical or electrical contact. However, coupled may also mean that two or more elements may not be in direct contact with each other, but yet may still cooperate or interact with each other.

It should be understood that embodiments of the present invention may be used in a variety of applications. Although the present invention is not limited in this respect, the circuits disclosed herein may be used in many apparatuses such as in the transmitters and receivers of a radio system. Radio systems intended to be included within the scope of the present invention include, by way of example only, wireless local area networks (WLAN) devices and wireless wide area network (WWAN) devices including wireless network interface devices and network interface cards (NICs), base stations, access points (APs), gateways, bridges, hubs, cellular radiotelephone communication systems, satellite communication systems, two-way radio communication systems, one-way pagers, two-way pagers, personal communication systems (PCS), personal computers (PCs), personal digital assistants (PDAs), and the like, although the scope of the invention is not limited in this respect.

Types of wireless communication systems intended to be within the scope of the present invention include, although not limited to, Wireless Local Area Network (WLAN), Wireless Wide Area Network (WWAN), Code Division Multiple Access (CDMA) cellular radiotelephone communication systems, Global System for Mobile Communications (GSM) cellular radiotelephone systems, North American Digital Cellular (NADC) cellular radiotelephone systems, Time Division Multiple Access (TDMA) systems, Extended-TDMA (E-TDMA) cellular radiotelephone systems, third generation (3G) systems like Wide-band CDMA (WCDMA), CDMA-2000, and the like, although the scope of the invention is not limited in this respect.

Referring now to FIG. 1, a block diagram of a lock and key programming architecture to program a pair of radio frequency identification (RFID) tags in accordance with the present invention will be discussed. As shown the programming architecture 100 of FIG. 1, during a programming phase a programming module 110 may create a matching pair of tags, a lock tag 112 and key tag 114, using one or more RFID readers, RFID reader 116 and RFID reader 118. In one embodiment of the invention, RFID reader 116 may be the same device as RFID reader 118, and in an alternative embodiment RFID reader 116 may be a device separate from RFID reader 118, and furthermore RFID reader 116 may be separated from RFID reader 118 in space or time, although the scope of the invention is not limited in this respect. It is not required that lock tag 112 and key tag 114 be created at the same time or at the same location. In one embodiment of the invention, when lock tag 112 and key tag 114 are not created at the same time or at the same location, programming module 110 may store information to create the other tag of the matching pair of RFID tags at a later time. Furthermore, in one particular embodiment of the invention, programming module 110 may create more than one identical lock tag 112 or more than one identical key tag 114 wherein the key tags 114 may match the lock tags 112 in the set, although the scope of the invention is not limited in this respect.

One application of lock and key programming architecture 100 may be for amusement park security or the like. In such an application, for example, one lock tag 112 may be created for a child and one key tag 114 may be created for each parent or guardian of the child. Detection of a lock tag 112 and a key tag 114 may occur at the park gates, for example using a lock and key detection architecture 200 as shown in and described with respect to FIG. 2. If a child having a lock tag 112 were to attempt leave the park without a parent or guardian present having a corresponding key tag 114, an alarm may sound and the child may be prevented from leaving the park. In another example application of lock and key programming architecture, 100 such as in a department store for example, a lock tag 112 may be affixed to a product, and the lock tag 112 may be additionally tamper-resistant, when the product is stock on a shelf. Detection of a lock tag 112 and a key tag 114 may occur at the front door of the store, fore example using the lock and key detection architecture 200 of FIG. 2. A key tag 114 corresponding to the lock tag 112 of the product may be generated by the register at checkout and affixed to the receipt of payment. During detection at the front door of the store, if an attempt was made to exit the store with the product but without the corresponding appropriate receipt having the key tag 114, an alarm may sound. In at least one embodiment of the invention, information stored on one or both of lock tag 112 and key tag 114 may be a secret, may be encoded, and the tags may further be tamper resistant, although the scope of the invention is not limited in this respect.

Figure 2:
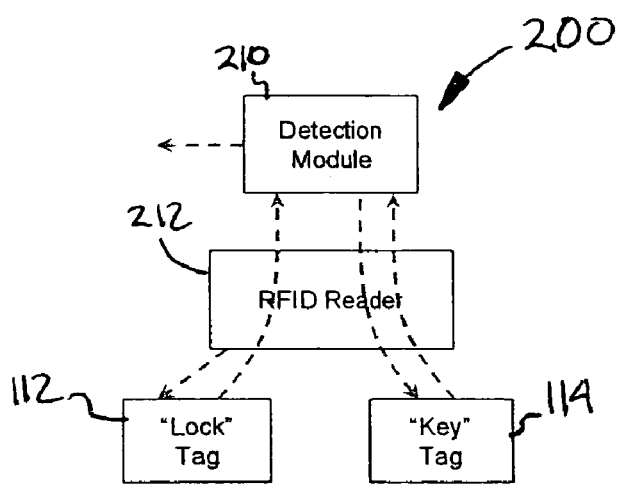
FIG. 2 is a block diagram of a lock and key detection architecture to detect an RIFD lock tag and key tag pair in accordance with one embodiment of the present invention.

Referring now to FIG. 2, a lock and key detection architecture to detect an RIFD lock tag and key tag pair in accordance with one embodiment of the invention will be discussed. As shown in FIG. 2, the lock and key detection architecture 200 may be controlled by a detection module 210 that may be connected to an RFID reader 212. In one embodiment of the invention, RFID reader 212 may be the same device as a either one or both of RFID reader 116 and 118, or may be a separate RFID reader disposed at a location separate from the location of either one or both of RFID reader 116 and RFID reader 118. In one embodiment of the invention, lock and key detection architecture 200 may identify one or more lock tags 112 that may be present, for example within an operational range of RFID reader, and may detect the presence or absence of one or more matching key tags 114 that are also present, for example within an operational range of RFID reader 212, optionally within a predetermined time window, for the one or more present lock tags 112, although the scope of the invention is not limited in this respect.

In one embodiment of the invention, the detection of the presence of a lock tag 112, or the announcement of the presence of a lock tag 112, may be considered as trusted since in the event of a spoof or an attack, a false alarm may be generated and dealt with accordingly. Typically, either one or both of lock tag 112 or key tag 114 may not trusted to perform verification since in the event of a spoof or an attack, a false verification may occur, although the scope of the invention is not limited in this respect. In accordance with one embodiment of the present invention, a challenge and response architecture such as the key detection architecture 200 may be utilized to validate that a key tag 114 matches a given lock tag 112, although the scope of the invention is not limited in this respect.

In one embodiment of the invention, public key cryptography may be utilized to ensure proper validation of key tag 114. In such an embodiment, during a programming phase as implemented by lock and key programming architecture 100, lock tag 112 may be given a public key, and key tag 114 may be given a matching private key. In the event both lock tag 112 and key tag 114 are not created at the same time, for example as in the a department store example, then a private key that matches the public key may be securely stored to allow subsequent programming of key tag 114.

As shown in FIG. 2, a challenge and response protocol may be implemented by lock and key detection architecture 200. RFID reader 212 may initiate detection by periodically sending an activation signal to RFID tags that may be in the vicinity that is within the operating range of RFID reader 212. In the event one or more lock tags 112 are present, the lock tags 112 respond to RFID reader 212 with their public keys. Such public key information may not be a secret, and RFID tag 212 may be delivered to detection module 210 for use in preparation of a challenge for one or more of the lock tags 112. The challenges may be utilized to identify one or more paired key tags 114. Detection module 210 sends a challenge as part of a subsequent activation signal from the RFID reader. If one or more corresponding key tags 114 are present, the one or more key tags 114 may utilize their private keys to formulate and send an appropriate challenge response. If an appropriate challenge response is not received within a predetermined timeout period, detection module 210 may signal an alarm.

Figure 3:
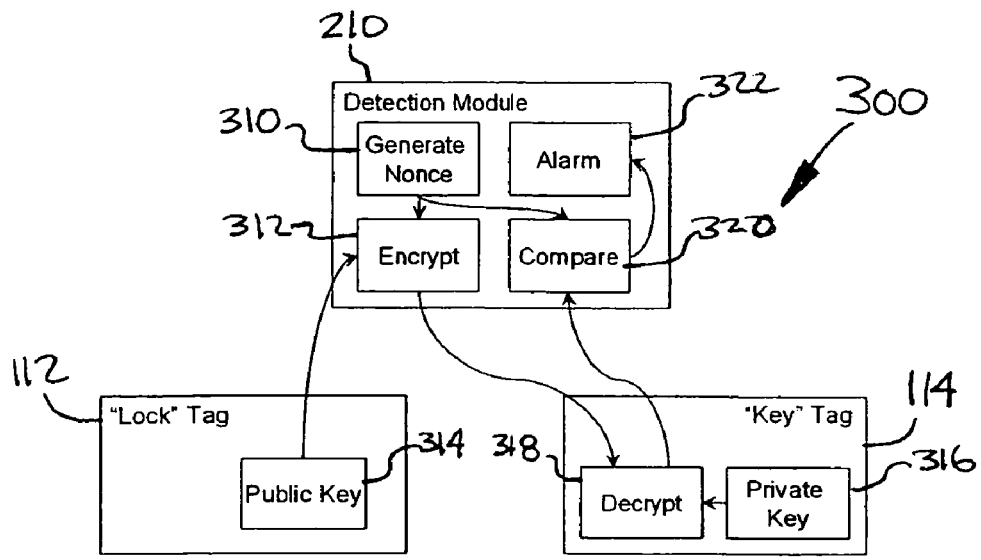
FIG. 3 is a data flow diagram of a method to detect a lock and key using a public cryptography key in accordance with one embodiment of the present invention.

Referring now to FIG. 3, a data flow diagram of a method to detect a lock and key using a public cryptography key in accordance with an embodiment of the invention will be discussed. As shown in the method 300 of FIG. 3, detection module 210 may generate a challenge by generating a random nonce at block 310 and encrypting the random nonce at block 312 using the public key obtained from lock tag 112 at block 314. In at least one embodiment of invention, a nonce may be defined as a random value or string utilized in authentication protocols, although the scope of the invention is not limited in this respect. The challenge may then sent to one or more key tags 114 present in the vicinity of detection module 210, and the nonce otherwise may be kept secret. When key tag 114 receives the challenge, key tag 114 may utilize its private key at block 316 to decrypt the nonce at block 318. Key tag 114 may then send the decrypted nonce back to detection module 210 for verification. The nonce may not be protected during a challenge response, as the nonce no longer may be a secret in the presence of an authorized key tag 114. Once detection module 210 receives a correct nonce, as determined by comparing at comparing block 320 the nonce received from key tag 114 to the nonce generated at block 310, a valid key tag is determined to be present, and no alarm is sounded. In the event it is determined at the comparing block 320 that the nonce generated at block 310 does not match the nonce sent to detection module 210 by key tag 114, and optionally within a predetermined time window or timeout period, a valid key tag 114 is not determined to be present, and alarm block 322 may generate an alarm, although the scope of the invention is not limited in this respect.

Figure 4:
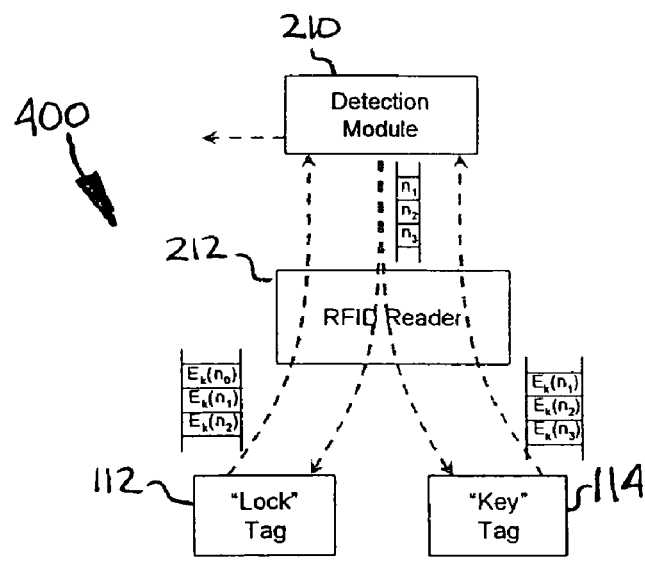
FIG. 4 is a block diagram of a lock and key detection architecture using symmetric key cryptography in accordance with an embodiment of the present invention.

Referring now to FIG. 4, a lock and key detection architecture using symmetric key cryptography in accordance with an embodiment of the present invention will be discussed. To allow validation of a key tag 114 by utilizing symmetric key cryptography, the same key may be placed on both lock tag 112 and key tag 114 during a programming phase such as a programming phase implemented by lock and key programming architecture 100. During a detection phase, a key tag 114 may prove that it holds the same key as a lock tag 112 without requiring disclosure of the key. As with a challenge and response using a public cryptography key as shown in FIG. 3, detection of a symmetric cryptography using detection module 210 may also implement a challenge and response protocol. As shown in FIG. 4, detection module 210 may generate and send a randomly generated nonce at a regular interval, thereby forming a stream of nonces. The RFID tags may receive the nonces broadcast from detection module 210 and may utilize their own keys to encrypt the nonces and to generate a response, thereby forming a response stream. In one embodiment of the invention, the response stream broadcast by one or more lock tags 112 may be delayed by one cycle, for example the responses from lock tags 112 may be an encryption of a previous nonce, although the scope of the invention is not limited in this respect.

Figure 5:
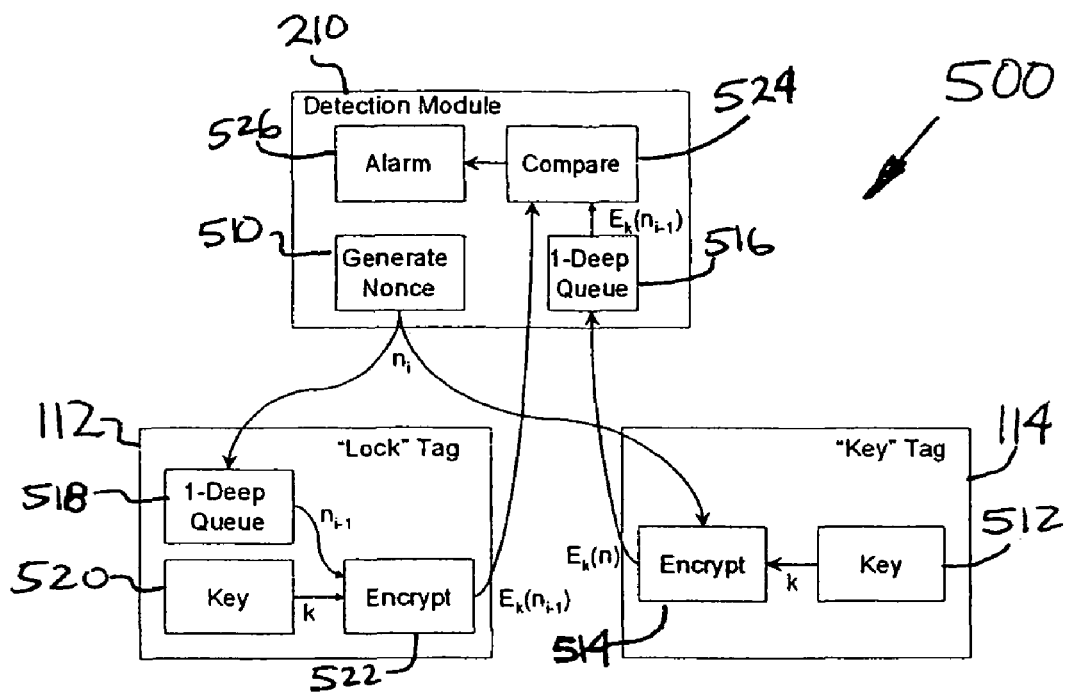
FIG. 5 is a data flow diagram of a method to detect a lock and key using a symmetric cryptography key in accordance with an embodiment of the present invention.

Referring now to FIG. 5, a data flow diagram of a method to detect a lock and key using a symmetric cryptography key in accordance with the present invention will be discussed. As shown in the method 500 of FIG. 5, to determine the validity of a key tag 114, detection module 210 may send generate a nonce at block 510. Key tag 114 may utilize its key at block 512 to encrypt a response at block 514 that is sent to detection module 210. Detection module 210 may receive the encrypted response from key tag 114, wait one cycle at queue block 516, and then send a subsequent nonce generated at block 510. Lock tag 112 may receive the nonce originally generated by detection module 210 at block 510, wait one cycle at queue block 518, and then utilize the key at key block 520 to encrypt the key at block 522. Detection module 210 may receive any encrypted response from lock tag 112 and compare at block 524 the response received from lock tag 112 to the response received from key tag 1114. Thus, for each response received from a lock tag 112 in a given round, detection module 210 may compare a response from a key tag 114 received in a previous round to determine if the log tag 112 and the key tag 114 contain matching encryption keys. In the event a match is not found within a predetermined period, for example within a few rounds to allow for data loss, detection module 210 may generate an alarm at block 526. In the event a match is found within the predetermined period, then an alarm is not sound, and in addition a successful match may be indicated, although the scope of the invention is not limited in this respect.

In the embodiment of the invention as discussed with respect to FIG. 5, the encrypted nonce in responses received from key tags 114 and lock tags 112 may be compared to verify that lock tags 112 possess matching key tags in the vicinity. Since a key tag 114 provides a response containing the encrypted nonce in the round prior to the response broadcast by a lock tag 112, generation of a new nonce may invalidate subsequent responses from key tags 114 so that a spoofer or an attacker may be prevented from providing a false matching response after a lock tag 112 provides its response. In such an arrangement, a false or a spoofed key tag 114 may be prevented from merely duplicating a response of a lock tag 112. In one embodiment of the invention, in the event an invalid or a spoofed lock tag 114 generates an encrypted nonce stream with no matching key, an alarm may be generated, and it may be difficult to create an invalid or a spoofed key tag 114 that matches an existing lock tag, although the scope of the invention is not limited in this respect.

Although the invention has been described with a certain degree of particularity, it should be recognized that elements thereof may be altered by persons skilled in the art without departing from the spirit and scope of the invention. It is believed that the radio frequency identification tag lock and key of the present invention and many of its attendant advantages will be understood by the forgoing description, and it will be apparent that various changes may be made in the form, construction and arrangement of the components thereof without departing from the scope and spirit of the invention or without sacrificing all of its material advantages, the form herein before described being merely an explanatory embodiment thereof, and further without providing substantial change thereto. It is the intention of the claims to encompass and include such changes.

What is claimed is:

1. An apparatus, comprising:
    a detector to determine whether a first radio frequency identification tag read by a reader that reads radio frequency identification tags is a match with a second radio frequency identification tag read by said reader and wherein one of the first and second radio frequency identification tags is a lock tag, and another of the first and second radio frequency identification tags is a key tag, and wherein said detector includes a nonce generator to generate a nonce, and a comparator to compare an encrypted version of the nonce encrypted using a cryptography key of the lock tag with an encrypted version of the nonce encrypted using a cryptography key tag.

2. An apparatus as claimed in claim 1, wherein one of the first and second radio frequency identification tags is a lock tag, and another of the first and second radio frequency identification tags is a key tag.

3. An apparatus as claimed in claim 1, wherein one of the first and second radio frequency identification tags is a lock tag, and another of the first and second radio frequency identification tags is a key tag, and wherein said detector authenticates the lock tag when said detector detects the lock tag and the key tag being within a predetermined distance of said detector.

4. An apparatus as claimed in 1, including an encryptor to encrypt a nonce using a public cryptography key received from the lock tag to provide an encrypted nonce to the key tag, and a comparator to compare a nonce generated by the nonce generator with a decrypted version of the encrypted nonce that was decrypted using a private cryptography key of the key tag.

5. An apparatus as claimed in claim 1, wherein the cryptography key of the lock tag is the same as the cryptography key of the key tag.

6. An apparatus as claimed in claim 1, wherein the nonce generator generates a series of nonces, wherein the lock tag delays encryption of the nonce with respect to encryption of the nonce by the key tag, and wherein said detector further comprises a delay to delay the encrypted version of the nonce encrypted by the key tag.

7. An apparatus as claimed in claim 1, wherein said detector determines whether the first radio frequency identification tag is a match with the second radio frequency identification tag or a third or more radio frequency identification tags.

8. A method, comprising:
generating a nonce;
encrypting the nonce using a cryptography key received from a first radio frequency identification tag to result in an encrypted nonce;
sending the encrypted nonce to a second radio frequency identification tag that decrypts the encrypted nonce to result in a decrypted nonce;
receiving the nonce from the second radio frequency identification tag;
comparing the nonce generated by said generating to the decrypted nonce; and
determining, as a result of said comparing, whether the first radio frequency identification tag is associated with said second radio frequency identification tag.

9. A method as claimed in claim 8, wherein the cryptography key received from the first radio frequency identification tag is a public key, and wherein the second radio frequency identification tag decrypts the encrypted nonce using a private key associated with the public key.

10. A method, comprising:
generating a series of nonces;
sending the series of nonces to a first radio frequency identification tag and a second radio frequency identification tag;
receiving encrypted versions of the series of nonces from the first and second radio frequency identification tags;
comparing the encrypted versions of the series of nonces received from the first radio frequency identification tag with the encrypted versions of the series of nonces received from the second radio frequency identification tag; and
determining, as a result of said comparing, whether the first radio frequency identification tag is associated with said second radio frequency identification tag.

11. A method as claimed in claim 10, wherein the first and second radio frequency identification tags encrypt the series of nonces using the same cryptography key.

12. A method as claimed in claim 10, wherein the first radio frequency radio identification tag delays the series of nonces with respect to the second radio frequency identification tag, and further comprising delaying the encrypted versions of the series of nonces received from the second radio frequency identification tag prior to said comparing.

13. An article comprising a storage medium having stored thereon instructions that, when executed by a computing platform, result in verification of association of at least two or more radio frequency identification tags by:
generating a nonce;
encrypting the nonce using a cryptography key received from a first radio frequency identification tag to result in an encrypted nonce;
sending the encrypted nonce to a second radio frequency identification tag that decrypts the encrypted nonce to result in a decrypted nonce;
receiving the nonce from the second radio frequency identification tag;
comparing the nonce generated by said generating to the decrypted nonce; and
determining, as a result of said comparing, whether the first radio frequency identification tag is associated with said second radio frequency identification tag.

14. An article as claimed in claim 13, wherein the cryptography key received from the first radio frequency identification tag is a public key, and wherein the second radio frequency identification tag decrypts the encrypted nonce using a private key associated with the public key.

15. An article comprising a storage medium having stored thereon instructions that, when executed by a computing platform, result in verification of association of at least two or more radio frequency identification tags by:
generating a series of nonces;
sending the series of nonces to a first radio frequency identification tag and a second radio frequency identification tag;
receiving encrypted versions of the series of nonces from the first and second radio frequency identification tags;
comparing the encrypted versions of the series of nonces received from the first radio frequency identification tag with the encrypted versions of the series of nonces received from the second radio frequency identification tag; and
determining, as a result of said comparing, whether the first radio frequency identification tag is associated with said second radio frequency identification tag.

16. An article as claimed in claim 15, wherein the first and second radio frequency identification tags encrypt the series of nonces using the same cryptography key.

17. An article as claimed in claim 15, wherein the first radio frequency radio identification tag delays the series of nonces with respect to the second radio frequency identification and wherein the instructions, when executed, further result in verification of association of at least two or more radio frequency identification tags by comprising delaying the encrypted versions of the series of nonces received from the second radio frequency identification tag prior to said comparing.

* * * * *

UNITED STATES PATENT AND TRADEMARK OFFICE
CERTIFICATE OF CORRECTION

| | |
|---|---|
| PATENT NO. | : 7,907,732 B2 |
| APPLICATION NO. | : 10/812651 |
| DATED | : March 15, 2011 |
| INVENTOR(S) | : Mark D. Yarvis |

It is certified that error appears in the above-identified patent and that said Letters Patent is hereby corrected as shown below:

Column 8:
Line 56, "radio frequency identification and" should be --radio frequency identification tag, and--.

Signed and Sealed this
Twenty-first Day of June, 2011

David J. Kappos
*Director of the United States Patent and Trademark Office*